(12) United States Patent
Sameer et al.

(10) Patent No.: US 10,687,040 B2
(45) Date of Patent: Jun. 16, 2020

(54) CAPTURING AND DISPLAYING A VIDEO IN AN IMMERSIVE REALITY ENVIRONMENT

(71) Applicant: RIZORT, INC.

(72) Inventors: Nishant Sameer, Bangalore (IN); Praneet Khare, Bangalore (IN); Sachin Kanodia, Foster City, CA (US)

(73) Assignee: RIZORT, INC, Foster City, CA (US)

( * ) Notice: Subject to any disclaimer, the term of this patent is extended or adjusted under 35 U.S.C. 154(b) by 49 days.

(21) Appl. No.: 16/108,086

(22) Filed: Aug. 21, 2018

(65) Prior Publication Data

US 2019/0058863 A1    Feb. 21, 2019

Related U.S. Application Data

(60) Provisional application No. 62/548,156, filed on Aug. 21, 2017.

(51) Int. Cl.
| | | |
|---|---|---|
| G06T 15/20 | (2011.01) | |
| H04N 13/178 | (2018.01) | |
| G06F 3/01 | (2006.01) | |
| H04N 13/117 | (2018.01) | |
| H04N 7/18 | (2006.01) | |
| H04N 5/232 | (2006.01) | |
| H04N 5/247 | (2006.01) | |

(52) U.S. Cl.
CPC ........... *H04N 13/117* (2018.05); *G06F 3/011* (2013.01); *G06F 3/012* (2013.01); *G06T 15/205* (2013.01); *H04N 5/23238* (2013.01); *H04N 5/247* (2013.01); *H04N 7/181* (2013.01); *H04N 13/178* (2018.05); *G06T 2215/16* (2013.01)

(58) Field of Classification Search
CPC .. H04N 13/117; H04N 5/23238; G06F 3/011; G06F 3/013
See application file for complete search history.

(56) References Cited

U.S. PATENT DOCUMENTS

| | | | | |
|---|---|---|---|---|
| 2014/0029912 A1* | 1/2014 | Takagi | | H04N 9/87 386/225 |
| 2017/0351732 A1* | 12/2017 | Jung | | G06F 3/0484 |
| 2018/0109643 A1* | 4/2018 | Patil | | H04L 67/2847 |

* cited by examiner

*Primary Examiner* — Grace Q Li
(74) *Attorney, Agent, or Firm* — Fresh IP PLC; Aubrey Y Chen

(57) ABSTRACT

A method of capturing and displaying a video in an immersive reality environment is disclosed. Each scene in the video file is constructed by joining an action segment and a static segment, wherein each of the action segment and the static segment in the scene are captured separately using a video production system. The video production system further conjoins each of the scenes together to construct the video file. A viewer may view each of the scenes in the video file on a playback device. The playback device may adaptively reconstruct each of the scenes in the video file based on the viewer's action. More specifically, the playback device adjusts the playback duration of each of the scenes based on the viewer's head movements. Further, the playback device also repositions the subsequent scenes based on a direction of gaze of the viewer.

9 Claims, 11 Drawing Sheets

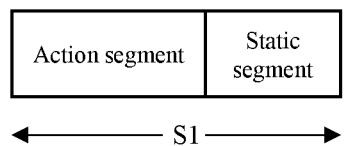
FIG. 5C
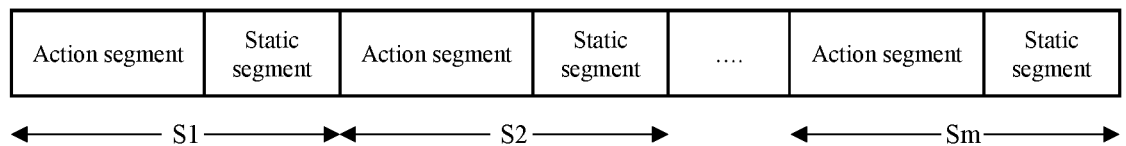
FIG. 5D
| Scene | Action segment $(t_{a1}, \text{offs}_{a1})$ | Static segment $(t_{s1}, \text{offs}_{s1})$ |
|---|---|---|
| S1 | (10,0) | (4, 12,500,000) |
| S2 | (7, 16,600,000) | (3, 25,020,000) |
FIG. 5E

CAPTURING AND DISPLAYING A VIDEO IN AN IMMERSIVE REALITY ENVIRONMENT

This non-provisional application claims priority to U.S. Provisional Application No. 62/548,156 filed Aug. 21, 2017, which is incorporated herein by reference in its entirety.

FIELD OF THE INVENTION

The present disclosure relates to capturing and displaying a video. More specifically, the present disclosure relates to capturing and displaying a 360 degree video in an immersive reality environment.

BACKGROUND TO THE INVENTION

Nowadays, brands and their marketing agencies increasingly rely on different digital marketing techniques to improve viewer engagement. The digital marketing techniques may include the use of virtual reality, augmented reality, immersive reality and so on. In one example, immersive reality or 360 degree videos are used to provide virtual tours around a place of interest. The place of interest may be a resort, hotel, building, an apartment, a tourist spot and so on.

The 360 degree video is recorded using a 360 degree video camera. Referring to FIG. 1, a 360 degree video camera 105 is shown. Typically, the 360 degree video camera 105 comprises a plurality of cameras mounted on a spherical rig as shown. Each camera among the plurality of cameras capture images from a different perspective simultaneously. Further, each of the images captured in an instance, are joined together to form a 360 degree image. Furthermore, a plurality of 360 degree images are joined together to form a 360 degree video. The 360 degree video captured may be further transferred to a playback device for displaying to a viewer. In one example, the playback device may be a head-mounted gear.

At present, 360 degree videos are captured by focussing on the objects of interest in a scene. Typically, the objects of interest may include mobile objects or characters that animate the scene. The object of interest is usually kept at a yaw of 0° while capturing the 360 degree images in the scene. (The yaw may be defined as the angle of rotation of the camera, about a pivot, about a vertical axis). For example, consider that a viewer V1 is viewing a 360 degree video using a head mounted gear. The viewer V1 may focus on an object A located at a yaw of 0°, in a first scene S1 of the 360 degree video, at a first point of time t1, as shown in FIG. 2A. As a result, the viewer V1 may view the object of interest, i.e., the object A, without moving his head to the left or right. At a second point of time t2, the viewer may turn his head to the left, in order to view an object B in the first scene S1, located at a yaw of −150° as shown in FIG. 2B. Now, consider that the first scene S1 transitions to a second scene S2, at a third point of time t3, while the viewer V1 is focussing on the object B as shown in FIG. 2C. In the second scene S2, a new object C may be located at a yaw of 0°. In order to view the new object C, the viewer V1 has to turn his head by 150° to the right. As a result, the viewer V1 misses the entrance of the new object C. In other words, the viewer V1 loses continuity of the narrative intended through the 360 degree video. In addition, in existing 360 degree videos, each of the scenes are captured separately and edited to comprise a fixed playback duration. In other words, the playback duration is not customisable by the viewer V1. Consequently, when the first scene S1 transitions to the second scene S2 as shown in FIG. 2C, the viewer V1 may experience a break in the narrative.

An existing solution to the above mentioned problems includes the introduction of a cross-fading or cross-mixing between the first scene S1 and the second scene S2. The crossfading between different scenes is shown in FIG. 3. The cross-fading or cross-mixing may indicate to the viewer that the scene is changing. Subsequently, the viewer may reposition his head to the initial position, i.e., at yaw of 0°.

Another existing solution comprises providing a navigation interface to the viewer upon finishing playback of a scene. The navigation interface may provide the viewer with options to select the next scene. For example, consider that the scene S1 has finished playback. The navigation interface enables the viewer to select the next scene from among a plurality of scenes S1, S2. S3 . . . Sn. In one example, the viewer may select scene S2 as the next scene. But, when the viewer is unfamiliar with the overall narrative, he may not be aware of which scene to choose next. Further, in certain instances, the navigation interface may seem too complex to the viewer. As a result, the viewer may not be able to view the narrative in a continuous manner.

SUMMARY OF THE INVENTION

This summary is provided to introduce a selection of concepts in a simple manner that are further described in the detailed description of the disclosure. This summary is not intended to identify key or essential inventive concepts of the subject matter nor is it intended for determining the scope of the disclosure.

An example of a capturing and displaying a video file in an immersive reality environment is disclosed. The method comprises capturing, by a first processor, a first action segment, a first static segment, a second action segment and a second static segment. The first action segment and the second action segment are video segments featuring at least one moving object, and the first static segment and the second static segment are video segments featuring only static objects. The method further comprises forming, by the first processor, a first scene by conjoining the first action segment with the first static segment, and a second scene by conjoining the second action segment with the second static segment. The method further comprises conjoining, by the first processor, the first scene with the second scene to construct a video file. The method further comprises reconstructing, by a second processor, the video file based on duration and file offset associated with the video file. The method further comprises displaying, by the second processor, a first scene to a viewer. The first scene comprises the first action segment followed by the first static segment. The method further comprises identifying, by the second processor, a direction of gaze of the viewer. The method further comprises transitioning, by the second processor, from the first scene to the second scene upon detecting a change in the direction of gaze of the viewer after reaching the end of the first static segment. The second scene comprises the second action segment followed by the second static segment. The method further comprises repositioning, by the second processor, the second scene in the direction of gaze of the viewer. The method further comprises displaying, by the second processor, the second scene to the viewer.

An example of a video production system for constructing a video file for an immersive reality environment is disclosed. The video production system comprises a first memory and a first processor coupled to the first memory. The first processor executes program instructions stored in the first memory to capture a first action segment, a first static segment, a second action segment and a second static segment. The first action segment and the second action segment are video segments featuring at least one moving object, and the first static segment and the second static segment are video segments featuring only static objects. The first processor further executes program instructions stored in the first memory to form a first scene by conjoining the first action segment with the first static segment, and a second scene by conjoining the second action segment with the second static segment. The first processor further executes program instructions stored in the first memory to construct a video file by conjoining the first scene with the second scene.

An example of a playback device for reconstructing scenes from a video file is disclosed. The playback device comprises a second memory and a second processor coupled to the second memory. The second processor executes program instructions stored in the second memory to reconstruct a video file based on a metadata file of the video file. The video file comprises a first action segment, a first static segment, a second action segment and a second static segment. The first action segment and the second action segment are video segments featuring at least one moving object, and the first static segment and the second static segment are video segments featuring only static objects. The second processor further executes program instructions stored in the second memory to display a first scene to a viewer. The first scene comprises the first action segment followed by the first static segment. The second processor further executes program instructions stored in the second memory to identify a direction of gaze of the viewer. The second processor further executes program instructions stored in the second memory to transition from the first scene to the second scene upon detecting a change in the direction of gaze of the viewer after reaching the end of the first static segment. The second scene comprises the second action segment followed by the second static segment. The second processor further executes program instructions stored in the second memory to reposition the second scene in the direction of gaze of the viewer. The second processor further executes program instructions stored in the second memory to display the second scene to the viewer.

To further clarify advantages and features of the present disclosure, a more particular description of the disclosure will be rendered by reference to specific embodiments thereof, which is illustrated in the appended figures. It is to be appreciated that these figures depict only typical embodiments of the disclosure and are therefore not to be considered limiting of its scope. The disclosure will be described and explained with additional specificity and detail with the accompanying figures.

BRIEF DESCRIPTION OF THE FIGURES

The disclosure will be described and explained with additional specificity and detail with the accompanying figures in which:

FIG. 5C illustrates a scene, in accordance with an exemplary embodiment of the present disclosure;

FIG. 5D illustrates a video file, in accordance with an exemplary embodiment of the present disclosure;

FIG. 5E illustrates a metadata file, in accordance with an exemplary embodiment of the present disclosure;

Figure 1:
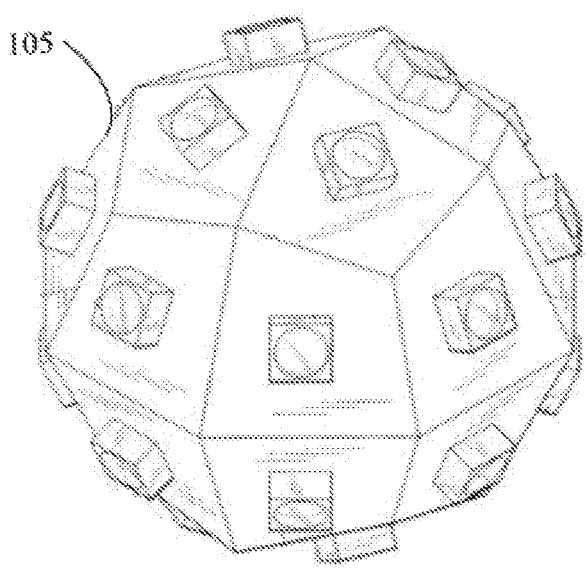
FIG. 1 illustrates a conventional 360 degree camera, in accordance with prior art.
Figure 2A:
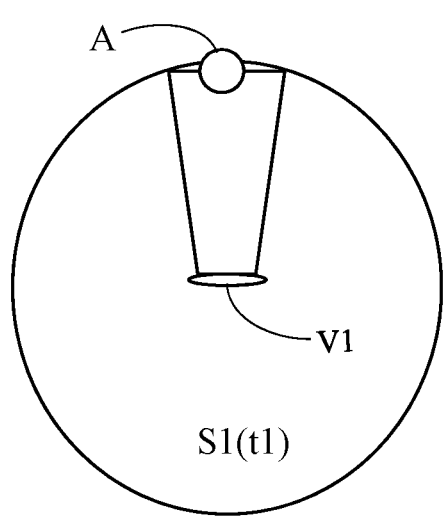
FIGS. 2A, 2B and 2C illustrate transition of scenes in a 360 degree video, in accordance with prior art.
Figure 2B:
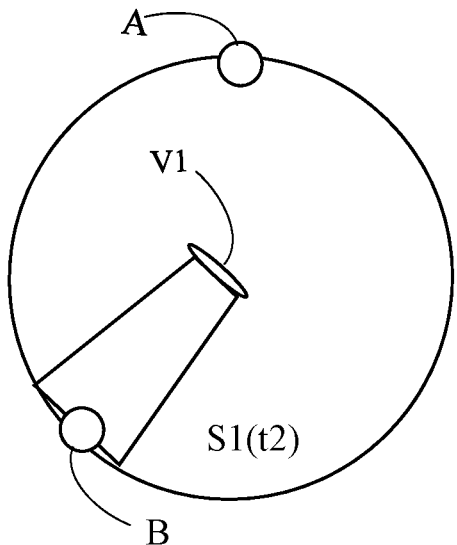
Figure 2C:
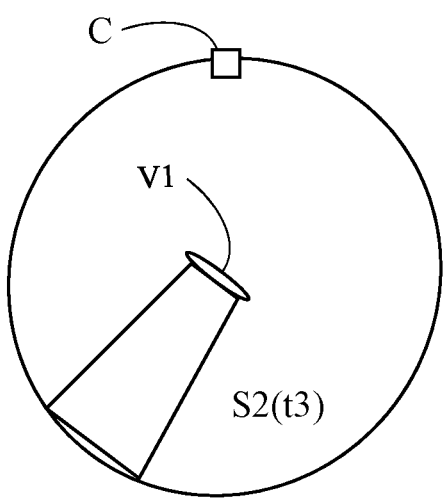
Figure 3:
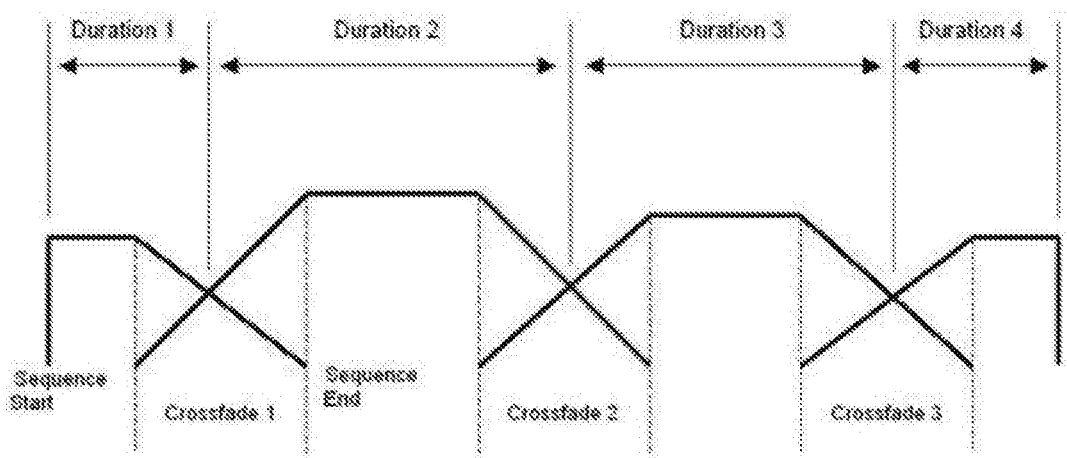
FIG. 3 illustrates cross-fading or cross-mixing between scenes in a 360 degree video, in accordance with prior art.

Further, persons skilled in the art to which this disclosure belongs will appreciate that elements in the figures are illustrated for simplicity and may not have been necessarily been drawn to scale. Furthermore, in terms of the construction of the video production system and/or the playback device, one or more components of the video production system and/or the playback device may have been represented in the figures by conventional symbols, and the figures may show only those specific details that are pertinent to understanding the embodiments of the present disclosure so as not to obscure the figures with details that will be readily apparent to those of ordinary skill in the art having benefit of the description herein.

DETAILED DESCRIPTION OF THE INVENTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more devices or sub-systems or elements or structures or components preceded by "comprises . . . a" does not, without more constraints, preclude the existence of other devices, other sub-systems, other elements, other structures, other components, additional devices, additional sub-systems, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The system, methods, and examples provided herein are illustrative only and not intended to be limiting.

The present disclosure discloses a method of capturing and displaying a video in an immersive reality environment. In other words, the disclosure relates to production of a 360 degree video using a 360 degree camera system, henceforth called 'video production system'. The 360 degree video (henceforth called 'video'), comprises a plurality of 360 degree scenes (henceforth called 'scenes'). The video production system constructs each of the scenes by combining an action segment and a static segment. The video production system further joins each of the scenes together to form a video file. The video file is further transmitted to a playback device along with a metadata file. The playback device adaptively reconstructs each of the scenes in the video file using data provided in the metadata file. More specifically, the playback device enables the viewer to explore each of the scenes in detail by providing a variable playback duration. The playback time is adjusted based on the movement of the viewer's head. Further, the playback device also ensures that the viewer experiences a continuous playback experience, by repositioning each of the scenes in the direction of gaze of the viewer.

Embodiments of the present disclosure will be described below in detail with reference to the accompanying figures.

Figure 4:
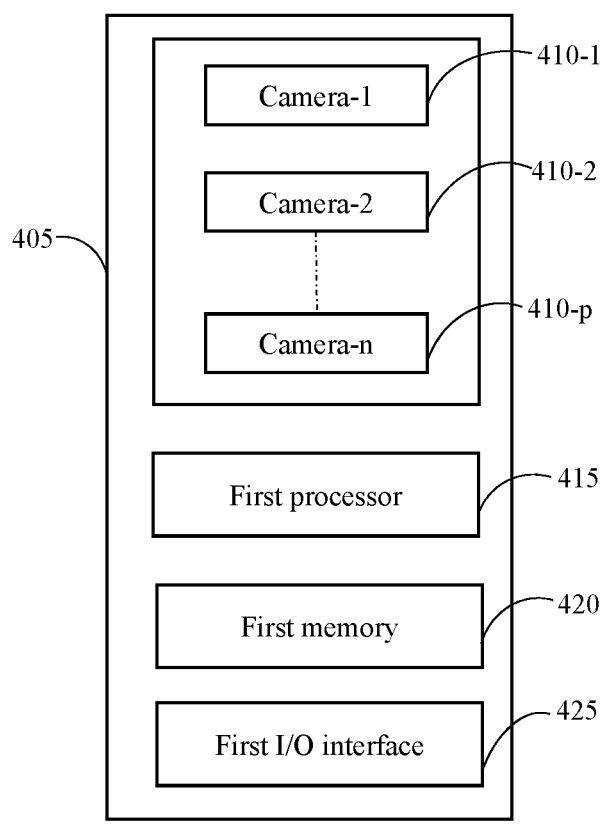
FIG. 4 illustrates a video production system for constructing a video file for an immersive reality environment, in accordance with one embodiment of the present disclosure.

Referring to FIG. 4, a video production system 405 for constructing a video file for an immersive reality environment is shown, in accordance with one exemplary embodiment of the present disclosure. The video production system 405 may comprise a plurality of cameras 410-1, 410-2 . . . 410-p, at least one first processor 415, a first memory 420 and a first Input/output (I/O) Interface 425.

Each camera among the plurality of cameras 410-1, 410-2 . . . 410-p is oriented in a different direction. Consequently, the video production system 405 may be configured to capture visuals in three dimensions. In other words, the field of view of the video production system 405 may extend to 360 degrees in any of the three dimension.

The at least one first processor 415 may be implemented as one or more microprocessors, microcomputers, microcontrollers, digital signal processors, central processing units, state machines, logic circuitries, and/or any devices that manipulate signals based on operational instructions. Among other capabilities, the at least one first processor 415 is configured to fetch and execute computer-readable instructions stored in the first memory 420.

The first memory 420 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The first I/O interface 425 may include a variety of software and hardware interfaces, for example, a web interface, a graphical user interface, and the like. Further, the I/O interface may enable the video production system 405 to communicate with other computing devices, such as web servers and external data servers (not shown). The I/O interface may facilitate multiple communications within a wide variety of networks and protocol types, including wired networks, for example, LAN, cable, etc., and wireless networks, such as WLAN, cellular, or satellite. The first I/O interface 425 may include one or more ports for connecting a number of devices to one another or to a server.

Figure 5A:
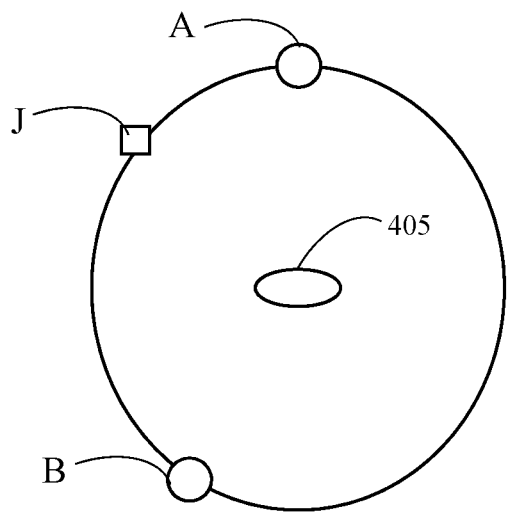
FIG. 5A illustrates an action segment, in accordance with an exemplary embodiment of the present disclosure.

To explain the construction of a video file using the video production system 405, an example may be used. Consider that a producer of the video file wishes to capture a scene featuring a first mobile object A, a second mobile object B and a static object J as shown in FIG. 5A. In order to capture the scene, at first, the producer captures an action segment using the video production system 405. The action segment may refer to a video segment featuring static objects and moving characters and/or objects. In other words, the field of view of the video production system 405 may include both static objects and moving characters and/or objects while capturing the active segment. In the present example, the action segment features the first mobile object A, the second mobile object B and the static object J. The action segment may be captured by allowing the first mobile object A and the second mobile object B to enter the field of view (as shown by the outer circle in FIG. 5A) of the video production system 405. Further, the first mobile object A and the second mobile object B may animate the action segment by playing their respective roles while the static object J is stationary. The action segment may be captured for a duration of $t_{a1}$ seconds.

Figure 5B:
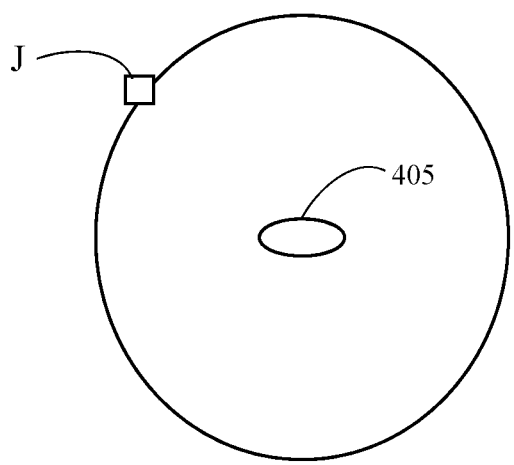
FIG. 5B illustrates a static segment, in accordance with an exemplary embodiment of the present disclosure.

After capturing the action segment, the producer may capture a static segment using the video production system 405. The static segment is a video segment featuring only static objects. In other words, the field of view of the video production system 405 may include only static objects while capturing the static segment. The static segment may be captured by removing all the moving characters and/or objects from the field of view as shown in FIG. 5B. In the present example, the first mobile object A and the second mobile object B are removed from the field of view of the video production system 405, to retain only the static object J. The static segment may be captured for a duration $t_{s1}$ seconds.

Upon capturing the action segment and the static segment, the video production system 405 constructs a scene S1 of duration $t_{a1}+t_{s1}$ to seconds by joining the action segment and the static segment. More specifically, the scene S1 is constructed by joining the video frames from the static segment to the action segment as shown in FIG. 5C. Similarly, the video production system 405 may construct a plurality of scenes S2, S3 . . . Sm. Each of the scenes S2, S3 . . . Sm are constructed by conjoining a respective action segment followed by a static segment. Further, the video production system 405 conjoins each of the scenes S1, S2, S3 . . . Sm in series to construct a video file as shown in FIG. 5D. Further, the video production system 405 also constructs a metadata file as shown in FIG. 5E. The metadata file may comprise data such as duration and file offset associated with each of the static segment and the action segment in a scene. For example, the scene S1 may comprise an action segment of duration $t_{a1}=10$ seconds and file offset $offs_{a1}=0$. Similarly, the static segment in scene S1 may have duration $t_{s1}=4$ seconds and file offset $offs_{s1}=12, 500,000$.

Figure 6:
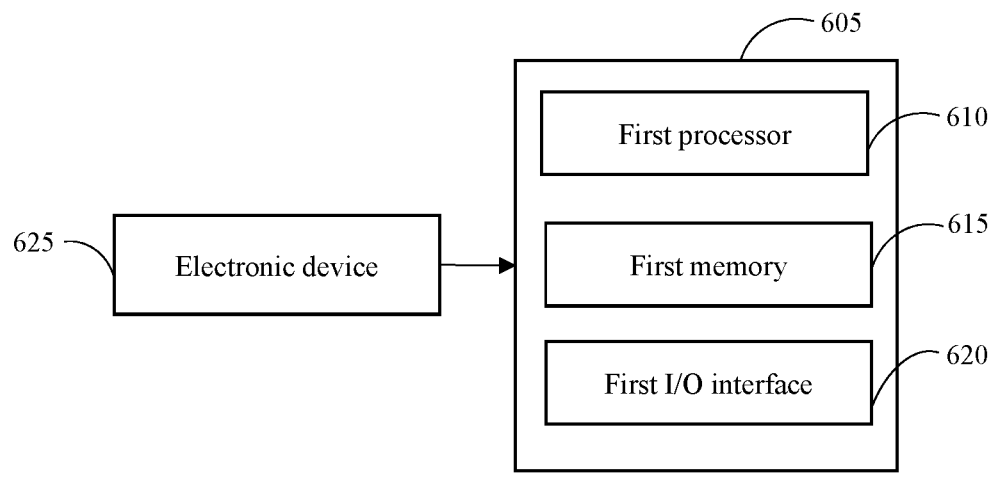
FIG. 6 illustrates a video production system for constructing a video file for an immersive reality environment, in accordance with another embodiment of the present disclosure.

Referring to FIG. 6, a video production system 605 for constructing a video file for an immersive reality environment is shown, in accordance with another embodiment of the present disclosure. The video production system 605 comprises a first processor 610 (similar to first processor 415), a first memory 615 (similar to first memory 420) and a first I/O interface module 620 (similar to first I/O interface module 425). Further, the video production system 605 may receive an existing video file from an electronic device 625. The existing video file may comprise a video captured using a conventional 360 degree video camera. In one example, the electronic device 625 may be an external mass storage device. In another example, the electronic device 625 may be a conventional 360 degree video camera. The 360 degree video camera may transfer visuals captured in real time to the video production system 605. The existing video file may be transferred from the electronic device 625 to the video production system 605 through wired transfer modes, e.g. via Universal Serial Bus (USB) interface, or through wireless transfer modes, e.g., Bluetooth transfer, Internet and so on.

The video production system 605 further analyses the existing video file received to identify action segments and static segments in each scene. Further, each of the scenes are reconstructed by conjoining action segments with respective static segments. Furthermore, each of the scenes are conjoined to form a new video file similar to the video file shown in FIG. 5D. Upon constructing the video file, the video production system 605 further constructs a metadata file as shown in FIG. 5E.

The video file and the metadata file constructed may be further transmitted to a playback device for adaptive reconstruction of the scenes. In one implementation, adaptive reconstruction may imply adjusting the playback duration of each scene based on a viewer's action or response. In one example, the viewer's action may be determined based on the viewer's head movements.

Figure 7:
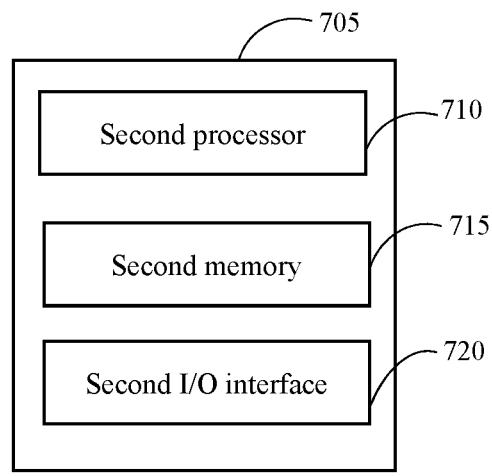
FIG. 7 illustrates a playback device for adaptive reconstruction of scenes from a video file in an immersive reality environment, in accordance with one embodiment of the present disclosure.

Referring to FIG. 7, a playback device 705 for adaptive reconstruction of scenes from a video file in an immersive reality environment is shown, in accordance with one embodiment of the present disclosure. The playback device 705 may comprise at least one second processor 710, a second memory 715 and a second I/O interface 720.

The at least one second processor 710 may be implemented as one or more microprocessors, microcomputers, microcontrollers, digital signal processors, central processing units, state machines, logic circuitries, and/or any devices that manipulate signals based on operational instructions. Among other capabilities, the at least one second processor 710 is configured to fetch and execute computer-readable instructions stored in the second memory 715.

The second memory 715 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The second I/O interface 720 may include a variety of software and hardware interfaces, for example, a web interface, a graphical user interface, and the like. Further, the I/O interface may enable the playback device 705 to communicate with other computing devices, such as web servers and external data servers (not shown). The I/O interface may facilitate multiple communications within a wide variety of networks and protocol types, including wired networks, for example, LAN, cable, etc., and wireless networks, such as WLAN, cellular, or satellite. The I/O interface 720 may include one or more ports for connecting a number of devices to one another or to a server.

In one example, the playback device 705 may be implemented in the form of a head-mounted gear. The playback device 705 may further comprise a plurality of sensors to detect the head movements of a viewer V. In one implementation, the plurality of sensors may include motion sensors such as gyroscopes and accelerometers. The motion sensors may enable the playback device 705 to determine a direction in which the viewer V is gazing (direction of gaze). The playback device 705 may determine the direction of gaze based on a yaw of the viewer's head. The yaw of the viewer's head may be defined as the angle by which a viewer V turns his/her head about a vertical axis. For example, if the viewer V turns his/her head to the left by 90°, then the yaw of the viewer's head is −90°. Similarly, if the viewer V turns his head to the right by 45°, then the yaw of the viewer's head is +45°. Further, the motion sensors may also detect changes in the direction of gaze of the viewer V.

Figure 8A:
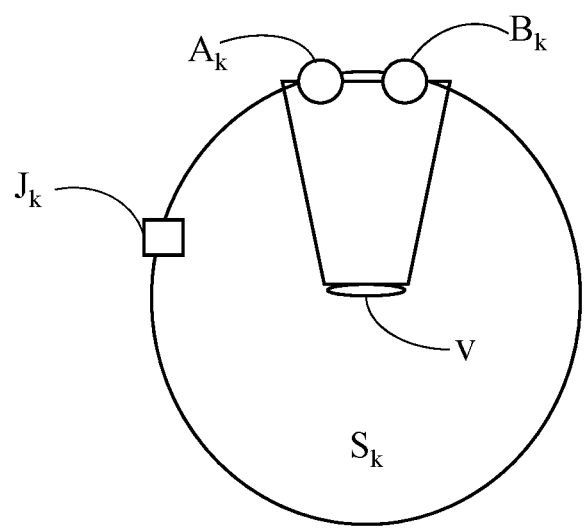
FIGS. 8A and 8B illustrate determining direction of gaze of a viewer, in accordance with an exemplary embodiment of the present disclosure.

Based on the direction of gaze determined, the playback device 705 may determine one or more points of interest of the viewer V within each scene. For example, consider that a first mobile object $A_k$ and a second mobile object $B_k$ are animating the action segment of a first scene Sk as shown in FIG. 8A. The first scene $S_k$ may further feature a stationary object $J_k$ as shown. The action segment of scene Sk may be of duration $t_{ak}$ seconds. The first mobile object $A_k$ and the second mobile object $B_k$ in the first scene $S_k$ are displayed on the playback device 705 at a yaw of 0°. In one example, the yaw of 0° may be set with reference to a position of the viewer's head at the start of the action segment of the first scene $S_k$.

Figure 8B:
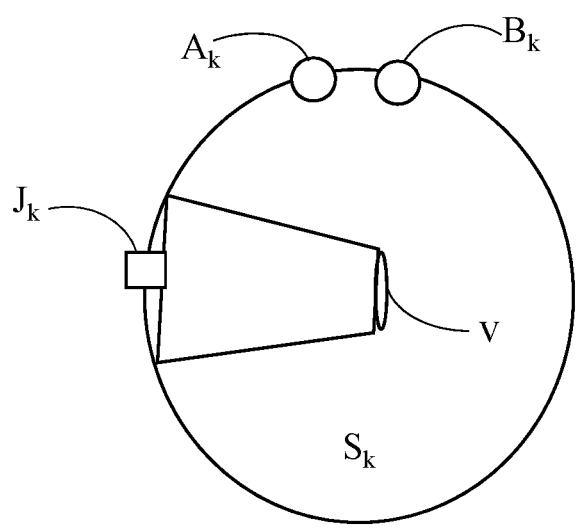

While watching the action segment, the viewer V may turn his/her head to the left side by 90° to explore the stationary object $J_k$, as shown in FIG. 8B. Subsequently, the playback device 705 determines that the direction of gaze of the viewer V is at a yaw of −90°. In other words, the playback device 705 determines that the point of interest (i.e., stationary object $J_k$), lies at a yaw of −90°. In another implementation, the point of interest may be determined by predictive analysis of the viewer's movements and/or direction of gaze. More specifically, the points of interest in a scene may be predicted based on the viewer's action while watching a previous scene.

Upon completing playback of the action segment, i.e., after $t_a k$ seconds, the playback device 705 displays the static segment of the scene $S_k$. The static segment may be of duration $t_{sk}$ seconds. Further, the playback device 705 determines whether the viewer V changes his direction of gaze after $t_{sk}$ seconds. In one example, the playback device 705 may determine the change in direction of gaze by detecting whether the change in yaw of the viewer's head is greater than a threshold value, say 20°.

If the direction of gaze is not changing, then the playback device 705 loops the static segment for another $t_{sk}$ seconds. Similarly, the playback device 705 may loop the static segment any number of times, until the viewer V changes his direction of gaze. In other words, the playback device 705 allows the viewer to explore the point of interest in the first scene $S_k$, i.e., the stationary object $J_k$, by adjusting the playback duration of the scene $S_k$. The playback duration of the scene $S_k$ may vary between $t_{ak}+t_{sk}$ seconds and $t_{ak}+n*t_{sk}$ seconds, where n may represent any natural number.

If the direction of gaze changes after $t_{ak}+t_{sk}$ seconds, then the playback device 705 transitions to a second scene $S_{k+1}$.

The second scene $S_{k+1}$ may refer to a scene subsequent to the first scene $S_k$ in the video file.

In another embodiment of the present disclosure, the playback device 705 may further reposition the second scene $S_{k+1}$ with respect to the yaw of the viewer's head. In other words, the objects of interest are projected at an angle equal to the yaw of the viewer's head, i.e., in the direction of gaze of the viewer V.

Figure 9A:
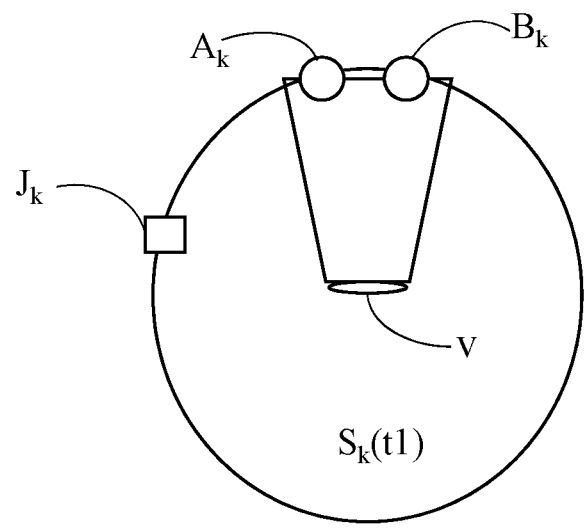
FIGS. 9A, 9B and 9C illustrate repositioning of a subsequent scene with respect to the direction of gaze of the viewer, in accordance with an exemplary embodiment of the present disclosure.
Figure 9B:
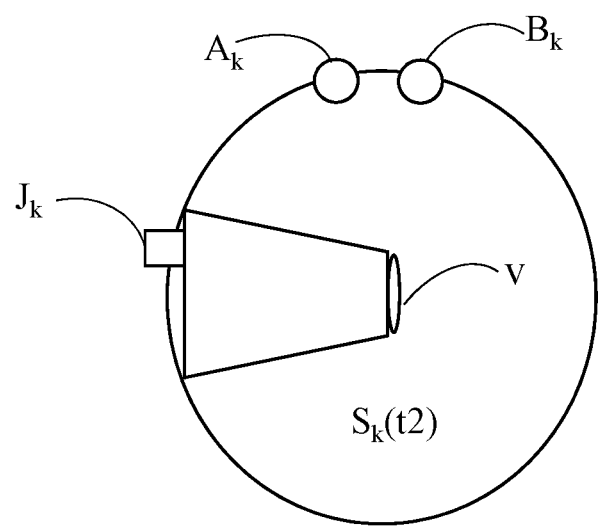
Figure 9C:
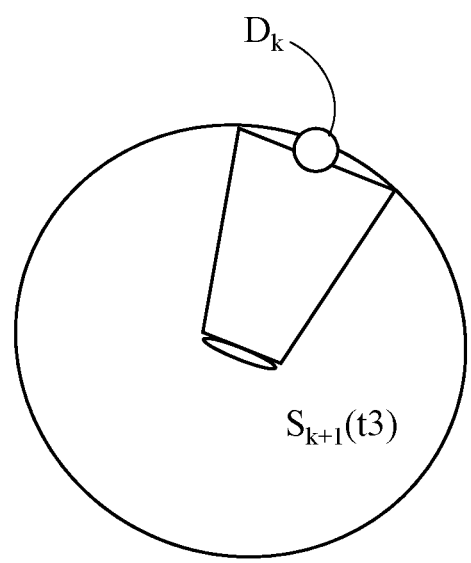

Referring to FIGS. 9A, 9B and 9C in conjunction with FIG. 7, repositioning of a subsequent scene with respect to the direction of gaze of a viewer V is shown, in accordance with one exemplary embodiment of the present disclosure. Consider that, at time t1, the viewer V is viewing the first mobile object $A_k$ and the second mobile object $B_k$ in the first scene $S_k$, as shown in FIG. 9A. The first mobile object $A_k$ and the second mobile object $B_k$ are projected at a yaw of 0°. Further, consider that at time t2, the viewer V turns left by 90° to focus on the stationary object $J_k$ in the first scene $S_k$, as shown in FIG. 9B. Now, the direction of gaze is at a yaw of −90°. As explained earlier, the playback device 705 may also adjust the playback duration of the first scene $S_k$ by looping the static segment.

The viewer V may change his/her direction of gaze to a yaw of +30°, at any time t3 after $t_{ak}+t_{sk}$ seconds from the beginning of the first scene $S_k$, as shown in FIG. 9C. Subsequently, the playback device 705 repositions the second scene $S_{k+1}$ by rotating the second scene $S_{k+1}$ by an angle of +30°. In other words, the second scene $S_{k+1}$ is projected such that a new object of interest $D_k$ lies in the field of vision of the viewer V. Similarly, each of the subsequent scenes in the video file are repositioned with respect to the direction of gaze of the viewer V. As a result, the viewer V does not miss the entry of the new object of interest $D_k$. In other words, the viewer sees a continuous video without experiencing any breaks in the narrative.

Although in the present disclosure the functioning of the playback device 705 is explained with respect to a head mounted gear, it must be understood that the playback device 705 may refer to devices including, but not limited to, mobile phone, personal computer, work station, personal digital assistant. More specifically, the playback device 705 may refer to any device in which the viewer may explore 360 degree visuals.

For example, consider that the playback device 705 is a mobile phone. The mobile phone comprises a plurality of motion sensors such as gyroscopes and accelerometers. The motion sensors may measure angular velocity, linear velocity, orientation and so on associated with the mobile phone. In one example, the viewer may pan the 360 degree visuals by tilting the mobile phone. In another implementation, the viewer may pan the 360 degree visuals by providing an input on the mobile phone. The input may be in the form of a touch input, a voice input, a hard press and so on. Alternatively, the viewer may also provide the input for actuating an I/O interface of the mobile phone using an input device such as a stylus. Similar to the previous embodiments, the direction of gaze may be determined based on the point of interest of the viewer. For example, the viewer may focus on the stationary object $J_k$ (located at yaw of 90°) in the first scene $S_k$, after tilting or rotating the mobile phone by an angle of 90° about a vertical axis. Upon determining the point of interest, the mobile phone may adjust the playback duration by looping the static segment, as explained above. Furthermore, the mobile phone may also reposition the second scene $S_{k+1}$ such that the new object of interest $D_k$ is displayed to the viewer in the current orientation or tilt.

Similarly, if the playback device 705 is a personal computer or a laptop, then the viewer may pan the 360 degree visuals by providing an input. The input may be in the form of a touch input, a voice input, hard press of a key and so on. Alternatively, the viewer may also provide the input using an input device such as a mouse, a joystick, a mouse pad and so on. In one example, the input may result in movement of a visible or invisible pointer across a screen of the personal computer. Further, the object of interest in the first scene $S_k$ may be identified based on the position of the pointer. Upon identifying the object of interest, the personal computer may adjust the playback duration of the first scene $S_k$. Further, the personal computer may also reposition or rotate the second scene $S_{k+1}$ such that the new object of interest $D_k$, is displayed in the current position of the pointer within the frame. In other words, the viewer may view the new object of interest $D_k$ without having to scroll back to the initial position, i.e., to the position at the start of the first scene $S_k$.

Figure 10:
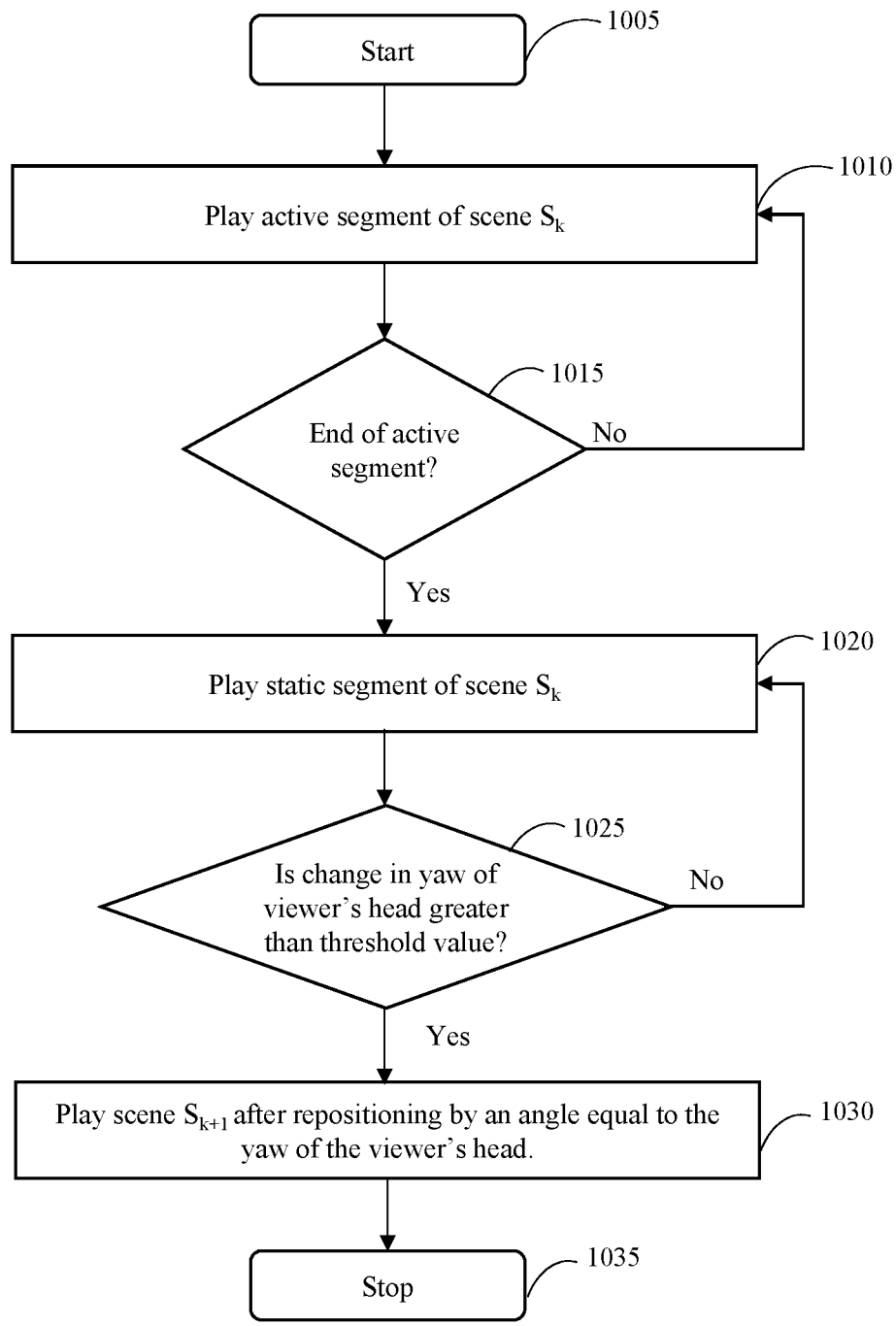
FIG. 10 shows a method for adaptively reconstructing a scene from a video file in an immersive reality environment, in accordance with one embodiment of the present disclosure.

Referring now to FIG. 10, a method 1000 for adaptively reconstructing a scene from a video file in an immersive reality environment is shown, in accordance with an embodiment of the present disclosure. The method 1000 may be described in the general context of computer executable instructions. Generally, computer executable instructions may include routines, programs, objects, components, data structures, procedures, modules, functions, etc., that perform particular functions or implement particular abstract data types. The method 1000 may also be practiced in a distributed computing environment where functions are performed by remote processing devices that are linked through a communications network. In a distributed computing environment, computer executable instructions may be located in both local and remote computer storage media, including memory storage devices.

The order in which the method 1000 is described and is not intended to be construed as a limitation, and any number of the described method blocks can be combined in any order to implement the method 1000 or alternate methods. Additionally, individual blocks may be deleted from the method 1000 without departing from the spirit and scope of the disclosure described herein. Furthermore, the method may be implemented in any suitable hardware, software, firmware, or combination thereof. However, for ease of explanation, in the embodiments described below, the method 1000 may be implemented in the above-described playback device 705.

The method begins at step 1005.

At step 1010, the playback device 705 plays an active segment of a first scene $S_k$.

At step 1015, the playback device 705 determines whether the end of the active segment has reached. If the end of the active segment is reached, then the step 1020 is executed. Otherwise, step 1010 is executed.

At step 1020, the playback device 705 plays the static segment of scene $S_k$.

At step 1025, the playback device 705 determines whether there is any change in the direction of gaze of the viewer. More specifically, the playback device determines whether there is any change in the yaw of the viewer's head. If there is a change in the yaw of the viewer's head, then step 1030 is executed. Otherwise, step 1020 is executed.

At step 1030, the playback device 705 plays the next scene $S_{k+1}$ after repositioning by an angle equal to the yaw of the viewer's head. In other words, the objects of interest are projected in the direction of gaze of the viewer.

The method ends at step 1035.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. A method of constructing and displaying a video file in an immersive reality environment, the method comprising:
   capturing, by a first processor, a first action segment, a first static segment, a second action segment and a second static segment, wherein the first action segment and the second action segment are video segments featuring at least one moving object, and wherein the first static segment and the second static segment are video segments featuring only static objects;
   forming, by the first processor, a first scene by conjoining the first action segment with the first static segment, and a second scene by conjoining the second action segment with the second static segment;
   conjoining, by the first processor, the first scene with the second scene to construct a video file;
   reconstructing, by a second processor, the video file based on duration and file offset associated with the video file;
   displaying, by the second processor, the first scene to a viewer, wherein the first scene comprises the first action segment followed by the first static segment;
   identifying, by the second processor, a direction of gaze of the viewer;
   transitioning, by the second processor, from the first scene to the second scene upon detecting a change in the direction of gaze of the viewer after reaching the end of the first static segment, wherein the second scene comprises the second action segment followed by the second static segment;
   repositioning, by the second processor, the second scene in the direction of gaze of the viewer; and
   displaying, by the second processor, the second scene to the viewer.

2. The method as claimed in claim 1, further comprising generating, by the first processor, the metadata file for the video file, wherein the metadata file comprises the duration and file offset associated with each of the first action segment, the first static segment, the second action segment and the second static segment.

3. The method as claimed in claim 2, wherein the second processor reconstructs the video file using the duration and file offset associated with each of the first action segment, the first static segment, the second action segment and the second static segment stored in the metadata file.

4. The method as claimed in claim 1, wherein the direction of gaze is identified based on a yaw of the viewer's head.

5. The method as claimed in claim 4, wherein the second scene is repositioned by rotating the second scene by an angle equal to the yaw of the viewer's head.

6. A playback device for displaying a video file in immersive reality, the playback device comprising:
   a second memory; and
   a second processor coupled to the second memory, wherein the second processor executes program instructions stored in the second memory to:
     reconstruct a video file based on a metadata file of the video file, wherein the video file comprises a first action segment, a first static segment, a second action segment and a second static segment, wherein the first action segment and the second action segment are video segments featuring at least one moving object, and wherein the first static segment and the second static segment are video segments featuring only static objects;
     display a first scene to a viewer, wherein the first scene comprises the first action segment followed by the first static segment;
     identify a direction of gaze of the viewer;
     transition from the first scene to the second scene upon detecting a change in the direction of gaze of the viewer after reaching the end of the first static segment, wherein the second scene comprises the second action segment followed by the second static segment;
     reposition the second scene in the direction of gaze of the viewer; and
     display the second scene to the viewer.

7. The playback device as claimed in claim 6, wherein the video file is reconstructed using the duration and file offset associated with each of the first action segment, the first static segment, the second action segment and the second static segment stored in a metadata file.

8. The playback device as claimed in claim 6, wherein the direction of gaze is identified using motion sensors in the playback device based on a yaw of the viewer's head.

9. The playback device as claimed in claim 8, wherein the second scene is repositioned by rotating the second scene by an angle equal to a yaw of the viewer's head.

* * * * *